UNITED STATES PATENT OFFICE.

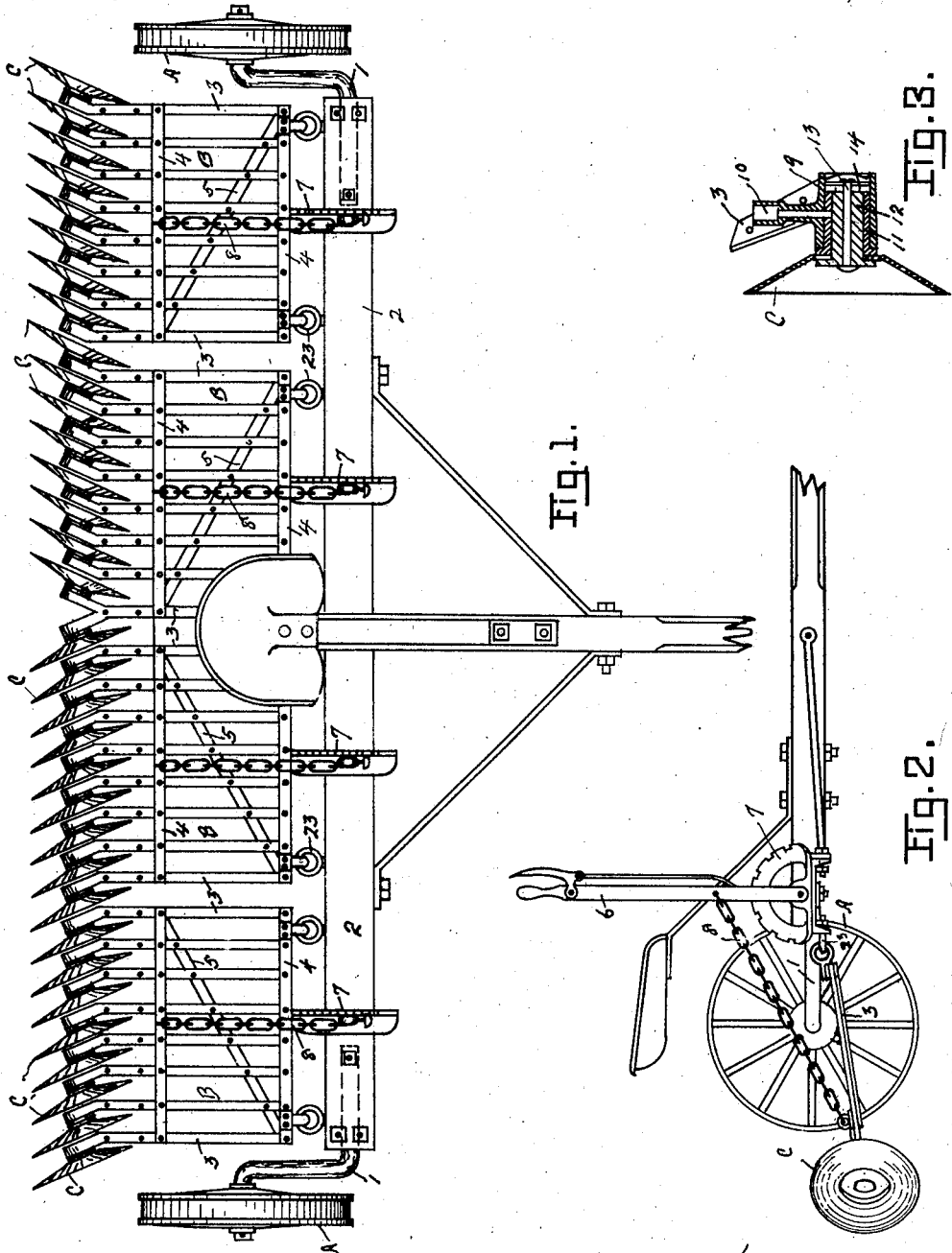

ISAAC J. WILSON, OF MALAD, IDAHO.

WEED-CUTTER.

1,333,145.  Specification of Letters Patent.  Patented Mar. 9, 1920.

Application filed April 2, 1919. Serial No. 287,053.

*To all whom it may concern:*

Be it known that I, ISAAC J. WILSON, a citizen of the United States, residing at Malad, in the county of Oneida and State of Idaho, have invented certain new and useful Improvements in Weed-Cutters, of which the following is a specification.

My invention relates to agricultural implements, and has for its object to provide an efficient weed cutter which may be adjusted vertically to cut the soil and weeds growing thereon at any desired depth and which will be light of draft and cut a wide swath.

These objects I accomplish with the device illustrated in the accompanying drawings in which similar letters and numerals of reference indicate like parts throughout the several figures and as described in the specification forming a part of this application and pointed out in the appended claim.

In the drawings in which I have shown a substantial embodiment of my invention, Figure 1 is a plan view of the device, part of tongue cut away. Fig. 2 is a side elevation of the same. Fig. 3 is a longitudinal section through one of the disk bearings.

In cutting weeds it is desirable that they be cut when small and as rapidly as possible, and in order to do that, the swath cut should be wide, the soil cut only to a shallow depth, and with as light draft machine as may be used.

In the present invention I provide two ground wheels A, which are journaled on an axle that is constructed of a transverse channel iron 2, with spindles 1, which are bolted on the end portions of said channel iron. I provide eyebolts 23 which are secured in said channel iron 2, and to which eyebolts the disk frames B are hinged. Said disk frames are constructed of disk beams 3 spaced apart in parallel relation to each other by the cross bars 4 and angle braces 5. The disk frames "B" are in sections for convenience in raising and lowering and in order that they may accommodate the sections of disks to the unevenness of the surface of the soil. Each of said frames "B" is provided with means for raising and lowering that individual section consisting of a hand lever 6 and the usual holding rack 7 with the chain 8 connecting one of said cross bars 4 of said frame with the lever 6. The said disk beams 3 extend rearwardly and form a portion of the individual bearing hubs for the disks C. The said hub bearings consist of a sleeve portion 9 in the upper side of which is provided an oiling cup 10. Within said sleeve 9 is provided a sleeve bearing 11, within which a disk axle 12 is journaled. Said disk axle 12 is secured to the disk and in bearing contact with said sleeve 11 by the bolt and nut screwed thereon 13, which passes through said disk bearing 12, sleeve 11 and a washer 14.

The disks C are set at an angle and the beams are spaced close together in order that all of the soil will be cut. One of said beams 3' centrally located in the device is bifurcated and two disks are journaled thereon, one of which is set at an angle to coact with the adjacent disks of that side of the device while the other disk is set at an angle to coact with the adjacent disks of the other side of the device.

Having thus described my invention I desire to secure by Letters Patent and claim:—

In a weed cutter comprising a transverse channel bar; spindles on said bar; supporting wheels carried by said spindles; rearwardly extending frames pivotally mounted for vertical movement from said bar, said frames consisting of spaced beams, braced intermediate of their ends, each beam provided at its rearward extremity by an offset portion; a bearing in said offset portion; a revoluble disk in said bearing; and means to individually raise or lower said frames.

In testimony whereof I have affixed my signature.

ISAAC J. WILSON.